United States Patent
Ding et al.

(10) Patent No.: US 9,608,892 B2
(45) Date of Patent: Mar. 28, 2017

(54) CLIENT-SIDE CLICK TRACKING

(71) Applicant: Google Inc., Mountain View, CA (US)

(72) Inventors: Zhongli Ding, Mountain View, CA (US); Dragan Zivkovic, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 739 days.

(21) Appl. No.: 13/940,645

(22) Filed: Jul. 12, 2013

(65) Prior Publication Data
US 2015/0161083 A1    Jun. 11, 2015

Related U.S. Application Data

(63) Continuation of application No. 13/194,875, filed on Jul. 29, 2011.

(51) Int. Cl.
G06F 17/22  (2006.01)
H04L 12/26  (2006.01)
H04L 29/08  (2006.01)
G06F 17/30  (2006.01)

(52) U.S. Cl.
CPC ......... H04L 43/10 (2013.01); G06F 17/3089 (2013.01); H04L 43/0876 (2013.01); H04L 67/22 (2013.01)

(58) Field of Classification Search
CPC . G06F 17/3089; H04L 43/0876; H04L 43/10; H04L 67/22
USPC ................................................. 709/224, 227
See application file for complete search history.

(56) References Cited

U.S. PATENT DOCUMENTS

| | | | |
|---|---|---|---|
| 5,717,860 A * | 2/1998 | Graber | G06F 17/30887 705/14.73 |
| 5,796,952 A | 8/1998 | Davis et al. | |
| 6,434,614 B1 * | 8/2002 | Blumenau | G06Q 30/02 709/203 |
| 6,859,833 B2 | 2/2005 | Kirsch et al. | |

(Continued)

OTHER PUBLICATIONS

Lee Barney (Using Enterprise Synchronization, Dec. 29, 2009, http://quickconnect.pbworks.com/w/page/10304137/ UsingEnterpriseSynchronization, retrieved on Nov. 2, 2012).
Office Action issued in U.S. Appl. No. 13/194,875 on Nov. 20, 2012, 19 pages.
Office Action issued in U.S. Appl. No. 13/194,875 on Mar. 29, 2013, 21 pages.

(Continued)

Primary Examiner — Abdulkader M Alriyashi
(74) Attorney, Agent, or Firm — Fish & Richardson P.C.

(57) ABSTRACT

Methods, systems, and apparatus, including computer programs encoded on a computer storage medium, for performing client-side click tracking. In one aspect, a method includes receiving, by a client, a resource from one or more servers. The resource includes (i) a link, (ii) click tracking code, and (iii) local storage monitoring code. The method includes invoking, by the client, the click tracking code and the local storage monitoring code, detecting, by the invoked click tracking code, a selection of the link, and generating, by the invoked click tracking code, a representation of the selection. The method includes storing, by the invoked click tracking code, the representation of the selection in a local storage on the client, determining, by the invoked local storage monitoring code, to communicate the representation of the selection; and communicating, by the invoked local storage monitoring code, the representation of the selection to the one or more servers.

12 Claims, 4 Drawing Sheets

(56) References Cited

U.S. PATENT DOCUMENTS

| | | |
|---|---|---|
| 7,367,508 B2 | 5/2008 | Christian |
| 7,409,422 B2 | 8/2008 | Christian et al. |
| 7,502,994 B2 | 3/2009 | Kocol |
| 2004/0215715 A1 | 10/2004 | Ehrich et al. |
| 2005/0044139 A1* | 2/2005 | Christian ............... G06Q 30/02 709/203 |
| 2005/0216844 A1* | 9/2005 | Error ................... G06F 17/3089 715/745 |
| 2007/0256003 A1 | 11/2007 | Wagoner et al. |
| 2008/0046562 A1 | 2/2008 | Butler |
| 2008/0162257 A1 | 7/2008 | Garg et al. |
| 2008/0178073 A1 | 7/2008 | Gao et al. |
| 2008/0195665 A1 | 8/2008 | Mason et al. |
| 2008/0235085 A1 | 9/2008 | Kovinsky et al. |
| 2009/0265460 A1 | 10/2009 | Balasubramanian et al. |
| 2010/0030792 A1 | 2/2010 | Swinton et al. |
| 2010/0287566 A1 | 11/2010 | Hauser |
| 2010/0325419 A1 | 12/2010 | Kanekar |
| 2010/0332550 A1 | 12/2010 | Ainslie |
| 2011/0093619 A1 | 4/2011 | Nelson |
| 2011/0185016 A1 | 7/2011 | Kandasamy et al. |
| 2011/0314092 A1 | 12/2011 | Lunt et al. |
| 2012/0030248 A1 | 2/2012 | Blinnikka |
| 2012/0254892 A1 | 10/2012 | Grabowski |
| 2012/0272338 A1 | 10/2012 | Falkenburg et al. |

OTHER PUBLICATIONS

CSS Pseudo-Classes, [online], [retrieved on Nov. 24, 2009]. Retrieved from the Internet <URL: http://www.w3schools.com/CSS/css_pseudo_classes.asp>, 4 pages.

Tizag, "CSS Tutorial—Pseudo Class & Mouseover." [online], [retrieved on Nov. 24, 2009]. Retrieved from the Internet <URL: http://www.tizag.com/cssT/pclass.php>, 3 pages.

Wikipedia, "Cascading Style Sheets." [online], [retrieved on Nov. 24, 2009]. Retrieved from the Internet <URL: http://en.wikipedia.org/wiki/Cascading_Style_Sheets>, 12 pages.

Wikipedia, "Markup Language." [online], [retrieved on Nov. 24, 2009]. Retrieved from the Internet <URL: http://en.wikipedia.org/wiki/Markup_language>, 7 pages.

Wikipedia, "Style Sheet Language." [online], [retrieved on Nov. 24, 2009]. Retrieved from the Internet <URL: http://en.wikipedia.org/wiki/Style_sheet_language>, 2 pages.

Office Action issued in U.S. Appl. No. 12/625,424 on Apr. 4, 2011, 30 pages.

Office Action issued in U.S. Appl. No. 12/625,424 on Nov. 16, 2011, 23 pages.

Notice of Allowance issued in U.S. Appl. No. 12/625,424 on May 7, 2012, 12 pages.

Notice of Allowance issued in U.S. Appl. No. 12/625,424 on May 22, 2013, 6 pages.

Office Action issued in U.S. Appl. No. 13/222,941 on Dec. 30, 2013, 18 pages.

* cited by examiner

CLIENT-SIDE CLICK TRACKING

CROSS-REFERENCE TO RELATED APPLICATION

This application is a continuation of U.S. application Ser. No. 13/194,875, filed Jul. 29, 2011, the contents which is incorporated by reference.

BACKGROUND

The present specification relates to click tracking.

Web site users can navigate to, or otherwise interact with, web pages by selecting (or "clicking") links and other controls. Information about user-selected links can be used by web site managers and web hosts to gain insight into user behavior.

Various techniques are used to track user clicks. Some systems use web logs to log click tracking parameters while processing user actions. Other systems use Uniform Resource Locator (URL) redirects to direct a user to an intermediary resource where clicks are logged, before directing the user to his or her intended destination. Other systems make AJAX requests to send click tracking information before performing the user's intended action. Other systems ping a click tracking server asynchronously by creating a fake Image object with the source set to a click tracking URL.

SUMMARY

According to one innovative aspect of the subject matter described in this specification, client side click tracking can be performed by monitoring the user selection of hyperlinks that include a particular embedded attribute. Monitoring can be performed using JavaScript code which, when invoked by a client, registers a handler that listens for the selection of the hyperlink, that stores information relating to the selection in a queue before performing an action associated with the hyperlink, and that periodically flushes the queue, thereby communicating the information relating to the selection to a server for processing.

Another innovative aspect of the subject matter described in this specification, a method includes receiving, by a client, a resource from one or more servers, where the resource includes (i) a link, (ii) click tracking code, and (iii) local storage monitoring code, and invoking, by the client, the click tracking code and the local storage monitoring code. The method includes detecting, by the invoked click tracking code, a selection of the link, generating, by the invoked click tracking code, a representation of the selection of the link, and storing, by the invoked click tracking code, the representation of the selection of the link in a local storage on the client. The method also includes determining, by the invoked local storage monitoring code, to communicate the representation of the selection of the link, and communicating, by the invoked local storage monitoring code, the representation of the selection of the link to the one or more servers.

Other embodiments of these aspects include corresponding systems, apparatus, and computer programs, configured to perform the actions of the methods, encoded on computer storage devices.

These and other embodiments may each optionally include one or more of the following features. For instance, the link is decorated with a client-side click tracking attribute; the client-side click tracking attribute includes a click tracking Uniform Resource Locator string; detecting a selection of the link includes registering, by the invoked click tracking code, an event listener to listen for a selection of a link that is decorated with the client-side click tracking attribute; the event listener is a capture-phase event listener; the link is decorated with a synchronization flag; determining to communicate the representation of the selection of the link comprises determining that the synchronization flag has a particular value, and communicating the representation includes communicating the representation synchronous to storing the representation of the selection of the link in the local storage, in response to determining that the synchronization flag has a particular value; communicating the representation synchronous to storing the representation of the link in the local storage includes communicating the representation without waiting a predetermined period of time after the representation of the link has been stored in the local storage; determining to communicate the representation of the selection of the link includes determining that the synchronization flag has a particular value, and communicating the representation includes determining that a predetermined time interval has elapsed, and communicating the representation in response to (i) determining that the synchronization flag has a particular value, and (ii) determining that the predetermined time interval has elapsed; the link includes a link to a phone dialer; the link includes a link to an intra-page link; the link does not include a redirect attribute; the method includes receiving, by the invoked local storage monitoring code, an acknowledgement that the representation of the selection of the link has been received by the one or more servers, then clearing the local storage; the local storage includes an HTML5 local storage; the representation identifies a Uniform Resource Identifier (URI) associated with the link, and specifies a time that the link was selected; and/or communicating the representation includes building a ping URL that includes the representation, and transmitting the ping URL to the one or more servers.

Advantageous implementations may include one or more of the following features. When a user interacts with a resource (e.g., a web page of a web site), information related to resource usage may be logged and reported asynchronously, without impacting performance of the navigation to the resource. When the user navigates to a different resource (e.g., a web page of a different website), resource usage information may be provided synchronously, ensuring that such information is not lost and that the information may be processed in a timely manner. Information regarding selections may be preserved in situations in which users may attempt to navigate away from a resource, or in which an application for presenting the resource (e.g., a web browser) may crash. A separation of code between tracking and reporting resource usage information may be maintained, potentially simplifying the process of integrating reporting mechanisms.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
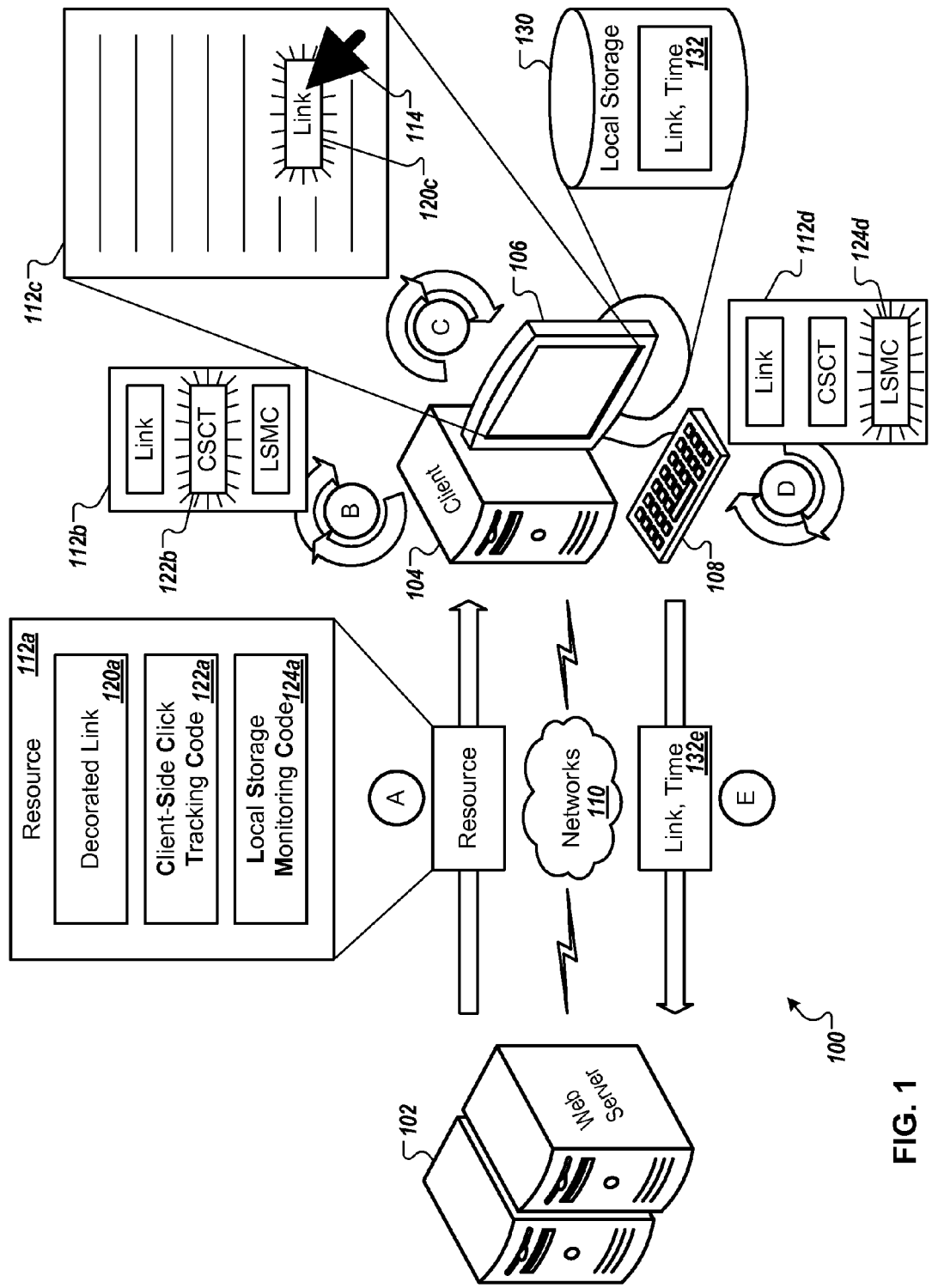
FIG. 1 is a diagram of an example system that may provide link selection information.

FIG. 1 is a diagram of an example system 100 that may provide link selection information. FIG. 1 also illustrates an example flow of data, shown in states (A) to (E). States (A) to (E) may occur in the illustrated sequence, or they may occur in a sequence that is different than in the illustrated sequence. For example, states (B), (C), and (E), may run concurrently in some implementations.

In general, the system 100 may capture various user actions, including intra-page selections (e.g., via widgets, phone dialers, etc.), navigation to different pages within a web site, and navigation to pages of external web sites. Information associated with selection events (e.g., link clicks) can be stored locally (e.g., by a web browser), can be accumulated, and can be provided (e.g., to a web server) periodically or upon the occurrence of particular user actions.

To facilitate the handling, tracking, and reporting of selection events, web links can include attributes that indicate whether the links are associated with web pages or other resources internal to or external to a particular web site. If a link associated with a web page internal to the web site is clicked by a user, for example, information related to the link selection may be stored locally by a web browser and may be accumulated with information associated with other user actions.

Periodically, e.g., based on a timer, the locally stored information may be provided by the web browser to a web server hosting the web site, or to a web server that tracks selection information. If a link associated with a web page external to the web site is clicked by the user, for example, information related to the link selection and any additional locally stored user activity information may be provided to the web server.

Thus, while the user interacts with the web site, information related to web site usage may be logged and reported asynchronously, without impacting web site performance. As the user navigates to a different web site, for example, site usage information may be provided synchronously, ensuring that web site usage information is not lost and that the information may be used by web site managers and web hosts in a timely manner.

User activity information (e.g., link clicks) can be used by web site managers and web hosts, for example, as a factor in designing and providing web pages to users. For example, links that receive a high number of clicks may be prominently placed within a web page. For situations in which the systems discussed here collect personal information (e.g., user activity) about individuals, the individuals may be provided with an opportunity to opt in or opt out of programs or features that may collect the personal information. In addition, certain data may be anonymized in one or more ways before it is stored or used, so that personally identifiable information is removed.

In further detail, the system 100 includes a web server 102 and a client computing device 104 in communication over one or more networks 110. The client computing device 104 can receive a resource 112a, e.g., a web page, from the web server 102 and can present information associated with the resource 112a to a user via a display device 106, e.g., a monitor displaying a web browser. The user can employ an input device 108 such as a keyboard, a mouse, a touch screen or another sort of input device to interact with the resource, and information associated with the interaction can be provided by the client computing device 104 to the web server 102 via the networks 110.

The web server 102 may include one or more servers, e.g., a cloud computing server, a server farm, or another server arrangement including one or more processors configured to execute instructions stored by a computer-readable medium for performing various server operations. In the present example, the web server 102 may be configured to host one or more web sites, to provide web site pages to users, and to receive and process information associated with user interactions (e.g., link clicks, etc.) with web pages.

The client computing device 104 may be a smart phone, a tablet computer, a notebook computer, a laptop computer, a desktop computer or any other appropriate portable or stationary computing device. The client computing device 104 may include one or more processors configured to execute instructions stored by a computer-readable medium for performing various client operations, such as input/output, communication, data processing, and the like. For example, the client computing device 104 can include or communicate with the display device 106, (e.g., a monitor) to present information associated with a web page resource to a user. The user, for example, can employ the input device 108 (e.g., a keyboard, a mouse, a touch screen, etc.) included in or in communication with the client computing device 104 to control a selection cursor 114 to interact with the web page resource.

The networks 110 connecting the client computing device 104 and the web server 102 may be wired or wireless, and may include a packet-based network, such as a TCP-IP network. The networks 110 may include a local area network such as an intranet, a wide area network, the Internet, or any appropriate combination thereof.

Referring to the example data flow, during state (A), the client computing device 104 receives the resource 112a (e.g., a web page) from the web server 102 via the networks 110. For example, a user of the client computing device 104 may employ a web browser to navigate to a web page of a web site hosted by the web server 102. The resource 112a can include a decorated link 120a augmented with one or more attributes or flags, client-side click tracking code 122a, and local storage monitoring code 124a.

The decorated link 120a may be specified upon generating the resource 112a, for example, and may include declarative information used to augment or modify handling of the link. For example, when constructing a visual element such as a widget that shows, hides, expands, or collapses other page elements, a phone number link, an intra-page link, a link from one page to another within a web site, a link to a page of an external web site, or another sort of visual element with which a user may interact, a developer and/or an automated process can determine whether or not user interactions with the visual element are to be tracked, and which mechanism are to be used for tracking. A web page may include multiple links, for example, each decorated with one or more attributes to be used by a web browser to implement various click tracking techniques.

The client-side click tracking code 122a and the local storage monitoring code 124a may include code (e.g., JavaScript) that can be executed by a web browser. Upon receiving the resource 112a, for example, a web browser executed by the client computing device 104 can initialize the resource 112a and can register one or more event listeners for the resource 112a. An event listener may be registered for the client-side click tracking code 122a, for example, and the code may be run within a corresponding web browser event handler. In addition, a timer (e.g., an interval) may be scheduled for the local storage monitoring code 124a. Based on the timer, for example, the web browser can trigger the local storage monitoring code 124a to process locally stored selection event information.

During state (B), the client computing device 104 runs the client-side click tracking code 122a, here shown as client-side click tracking code 122b, associated with the resource 112a, here shown as resource 112b. For example, a web browser executed by the client computing device 104 can include an event handler that continually monitors for events triggered by actions, such as selections, clicks, hovers, swipes, drags, and other user actions while interacting with the resource 112b (e.g., a web page).

During state (C), the client computing device 104 detects a selection of the decorated link 120a, here shown as decorated link 120c, included in the resource 112a, here shown as resource 112c. For example, a user can employ the input device 108 and the display device 106 of the client computing device 104 to control the selection cursor 114 and to interact with the resource 112 (e.g., a web page). Upon the user clicking a visual representation such as a control, a link or block of text, an image, a video, or another visual representation of the decorated link 120c, for example, a web browser presenting the web page can detect the click, and can run the client-side click tracking code 122a.

In the present example, the client computing device 104 may determine that information associated with user interactions with the decorated link 120c is to be stored locally. For example, based on one or more attributes or flags of the decorated link 120c, a web browser executed by the client computing device 104 may store user activity information 132 such as link and timestamp information in local storage 130, e.g., HTML5 Local Storage. The decorated link 120c, for example, may be an intra-page link, such as a link for expanding or collapsing a section of a web page, or for directing a user to a different page section. As another example, the decorated link 120c may be a link to a phone dialer or another such utility. As the user in the present example employs various web page features without attempting to exit the web page, user activity information may be collected and accumulated in the location storage 130.

During state (D), the client computing device 104 runs the local storage monitoring code 124a, here shown as local storage monitoring code 124d, associated with the resource 112a, here shown as resource 112d. For example, the local storage monitoring code 124d can be triggered by a timer maintained by a web browser executed by the client computing device 104. Upon a particular time interval such as a fraction of a second, a second, two seconds, five seconds, or another appropriate time interval, for example, the local storage monitoring code 124a may monitor the local storage 130 to identify stored user activity information 132.

During state (E), the client computing device 104 communicates the user activity information 132, here shown as user activity information 132e, to the web server 102 via the networks 110. For example, information related to user interaction with the decorated link 120c such as a link identifier, a time at which the link was interacted with, an identifier of the client computing device 104 employed by the user, a user identifier, an interaction type, and/or other user interaction information can be provided to the web server 102.

Upon receipt of the user activity information 132e, for example, the web server 102 may use the information to perform various processing and logging operations. For example, timestamps associated with user actions may be calibrated to determine correct times and sequences of the actions. User activity information 132e from the client computing device 104 may be logged and used to recreate a user session, for example. As another example, user activity information 132e from multiple client computing devices 104 may be logged and aggregated for use in identifying activity patterns related to web page and web site usage.

Figure 2:
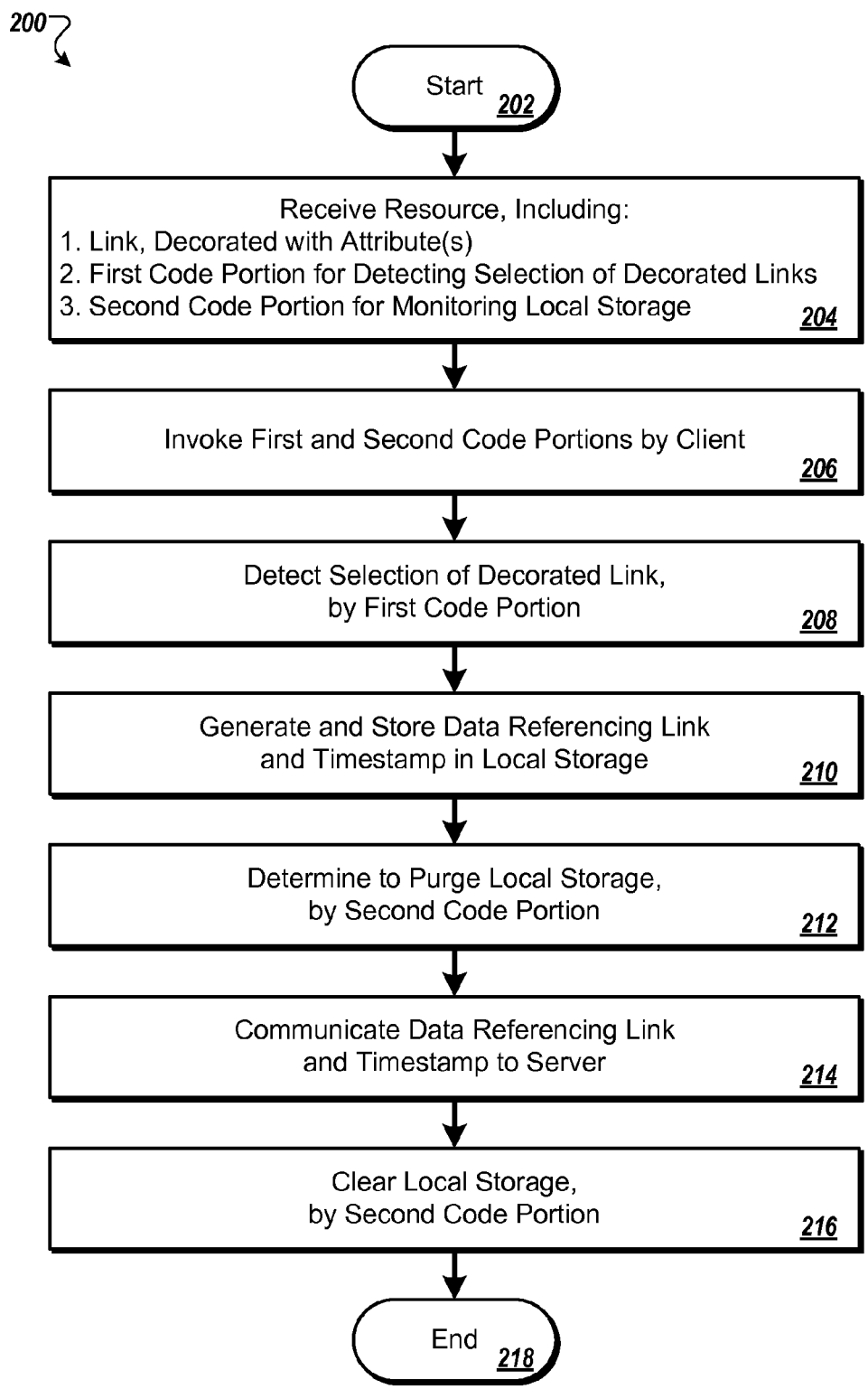
FIG. 2 is a flow chart illustrating an example process for detecting link selection and providing link selection information.

FIG. 2 is a flow chart illustrating an example process 200 for detecting link selection and providing link selection information. Briefly, the process 200 includes receiving a resource including a decorated link, code for detecting the selection of decorated links, and code for monitoring local storage. The code for detecting the selection of decorated links and the code for monitoring local storage are invoked by the client. Selection of the decorated link is detected, and data referencing the link selection is stored locally. A determination to purge the local storage is made by the code monitoring local storage, data referencing the link selection is communicated to a server, and the local code storage is cleared.

In more detail, when the process 200 begins (202), a resource is received (204). Referring to FIG. 1, for example, the client computing device 104 can receive the resource 112, e.g., a web page, from the web server 102 via the networks 110. The resource can include one or more links, each decorated with one or more attributes, a first code portion for detecting selection of the decorated links, and a second code portion for monitoring local storage. In the present example, the resource 112 includes the decorated link 120, the client-side click tracking code 122, and the local storage monitoring code 124.

In some implementations, a web page developer may specify whether user interaction with a link is to be tracked, and may also indicate an appropriate mechanism to be used for tracking. For example, the developer of a web page may assign an enumerated value to a particular link included on the web page, indicating a preferred click tracking option such as "none", "redirection", "client-side asynchronous tracking", "client-side synchronous tracking", and other suitable tracking options.

In the present example, a post processor, e.g., executed by the web server 102, can process the web page, considering tracking mechanisms applicable to the assigned option and/or the client runtime environment. For example, the post processor can compare a destination Uniform Resource Locator (URL) of a web link against a whitelist of web sites that may support asynchronous click tracking. As another example, the post processor can determine whether the client computing device 104 supports code, e.g., JavaScript that may be used to facilitate certain forms of click tracking. Upon post processing, for example, the web server 102 can provide a version of the resource 112, e.g., the web page, with versions of the decorated link 120, the client-side click tracking code 122, and/or the local storage monitoring code 124 suitable for use by the client computing device 104.

In some implementations, a link may be decorated with one or more client-side click tracking attributes. In the present example, for a particular link, the post processor executed by the web server 102 can consider the click tracking option specified by the web developer and the capabilities of the client computing device 104 to assign one or more attributes to the decorated link 120.

For example, links that are identified as being suitable for client-side click tracking may be decorated with a click tracking Uniform Resource Locator string. As another example, links that are identified as being suitable for synchronous or asynchronous click-tracking may be decorated with a synchronization flag. Such client-side click tracking attributes may be rendered as HyperText Markup Language (HTML) tags usable by JavaScript code executed on the client computing device 104, for example.

The first and second code portions are invoked (206) by the client. For example, the client computing device 104 can invoke the client-side click tracking code 122 and the local storage monitoring code 124. In some implementations, an event listener can be registered to listen for a selection of a link that is decorated with the client-side click tracking attribute. For example, a web browser executed by the client computing device 104 can register a click event listener for the capture phase, which may occur before the bubble phase based on JavaScript event ordering. Thus, in the present example, the registered click event listener may be triggered before other web browser event listeners are informed of a particular user action such as a click.

In some implementations, a timer may be configured to periodically trigger local storage monitoring code. For example, the timer may be configured to wake up at predetermined intervals (e.g., a fraction of a second, a second, two seconds, five seconds, etc.) and to trigger the local storage monitoring code 124. In some implementations, the predetermined interval may be configurable. For example, an interval value may be provided by the web server 102 to the client computing device 104 as a property of the resource 112. Different client devices and different runtime environments may be provided with different interval values, for example, based on capabilities of the devices, network connections and/or runtime environments.

Selection of the decorated link is detected (208) by the first code portion. For example, a user of the resource 112 (e.g., a web page) can select (e.g., click) the decorated link 120. In the present example, the web browser executed by the client computing device 104 can detect the click event associated with the selection of the decorated link 120 via the registered event handler and can run the client-side click tracking code 122.

Data referencing the link and timestamp data are generated and stored (210) in local storage. For example, the client-side click tracking code 122 can generate a serialized representation including identifiers and attributes of the decorated link 120 and can store the representation with a timestamp indicating the time the user clicked the link. The representation, for example, may include a Uniform Resource Identifier (URI) associated with the link. The representation and timestamp can be stored as user activity information 132 in the local storage 130, e.g., HTML5 local storage, for example, along with a value indicating that the stored information is related to client-side click tracking.

In the present example, as additional user interactions with the resource 112 are detected, additional information associated with the interactions can be added to the local storage 130 as user activity information 132. For example, additional link representations and timestamps can be appended to existing representations and timestamps to form a comma-separated list. By storing user activity information, such as information related to click events, as it occurs, the information may be preserved in situations in which a user attempts to navigate away from a web page or web site, or in which a web browser may crash, for example. If a web browser were to crash during the user's session, for example, user activity information 132 stored in local storage 130 may persist, and may be eventually provided to the web server 102 upon the user re-launching the web browser and returning to a web site associated with the resource 112.

Purging of the local storage is determined (212) by the second code portion, and data referencing the link and timestamp is communicated (214) to the server. For example, the local storage monitoring code 124 and/or the client-side click tracking code 122 of the resource 112 can determine whether and when to purge the local storage 130. In some implementations, communicating the representation of the link selection to one or more servers may include purging the representation. For example, the client computing device 104 may communicate the user activity information 132 to the web server 102 and may purge the information from the local storage 130.

In some implementations, communicating the representation of the link selection and purging of the local storage may be based at least in part on the value of a synchronization flag associated with the link. For example, if the decorated link 120 is associated with an attribute indicating client-side click tracking and with a flag indicating asynchronous communication of user activity information, communicating the representation and purging the local storage may be based on determining that a predetermined timer has elapsed. For example, a timer associated with a web browser can periodically trigger the local storage monitoring code 124 to communicate user activity information 132, e.g., link representations and timestamps, stored in local storage 130 to the web server 102. Upon providing the user activity information 132, for example, the local storage 130 may be purged.

However, if the decorated link 120a is associated with a client-side click tracking attribute and with a flag indicating synchronous communication of user activity information, for example, communicating the representation may be performed synchronously to storing the representation of the selection of the link in the local storage. For example, upon the user clicking the decorated link 120, the client-side click tracking code 122 may determine that the link is associated with an attribute indicating client-side click tracking and with a flag indicating synchronous communication of user activity information. In the present example, the client-side click tracking code 122 can add a representation and timestamp associated with the decorated link 120 to the local storage 130 and can communicate the user activity information 132 to the web server 102 without waiting a predetermined period of time after the representation of the link has been stored in the local storage.

In some implementations, communicating the representation may include building a ping URL that includes the representation, and transmitting the ping URL to the one or more servers. For example, to provide the user activity information 132 to the web server 102, an event handler of a web browser executed by the client computing device 104 may add a client ping time to the information, e.g., at the start of a string, may URI encode the information, and may issue an AJAX request to the web server 102.

In some implementations, a ping URL format may include the following format:

/m/url?sa=T&atype=i&ctyp=csct&cad={cad}

In the above format, "cad" represents one or more serialized events in the following format:

clientPingTime, eventTime:cturl, eventTime:cturl[ . . . ]

In the above format, "cturl" represents the click tracking URL, that is, the URL which is being click tracked.

Pings to the server may be synchronous or asynchronous. Synchronous pings, for example, may send user activity information associated with the last triggered event, i.e., an event for which synchronous handling is appropriate, and locally stored user activity information associated with any other events that may have preceded the event. Asynchronous pings, for example, may be triggered by a timer, and may send locally stored user activity information associated with events that may have preceded the elapsing of the timer's time interval.

By reporting some user interactions asynchronously and some synchronously, for example, user activity (e.g., clicks) may be appropriately reported within the context of a user's actions. For example, intra-page or intra-site interactions, e.g., interacting with controls which expand/collapse web page sections, navigating to different sections within a web page, navigating to different web pages within a web site, and other interactions can be accumulated and can be periodically reported in an asynchronous manner, without impacting web page performance. Intra-site interactions, e.g., a user navigating to another site, can be reported synchronously, for example, to ensure that user activity information is reported before the user exits a web site.

Local storage is cleared (216) by the second code portion, thereby ending (218) the process 200. For example, the local storage monitoring code 124 can clear the user activity information 132 from the local storage 130 upon providing the information 132 to the web server 102. In some implementations, the invoked local storage monitoring code may receive an acknowledgement that the representation of the selection of the link has been received by the one or more servers, then may clear the local storage.

For example, after receiving the user activity information 132 from the client computing device 104, the web server 102 can provide an acknowledgement of the receipt of the information 132 to the client computing device 104. Upon receiving the acknowledgement, for example, the local storage monitoring code 124 can purge the local storage 130 of the user activity information 132. Thus, in the present example, the system 100 can ensure the successful transfer of information related to user interactions with the resource 112.

Figure 3A:
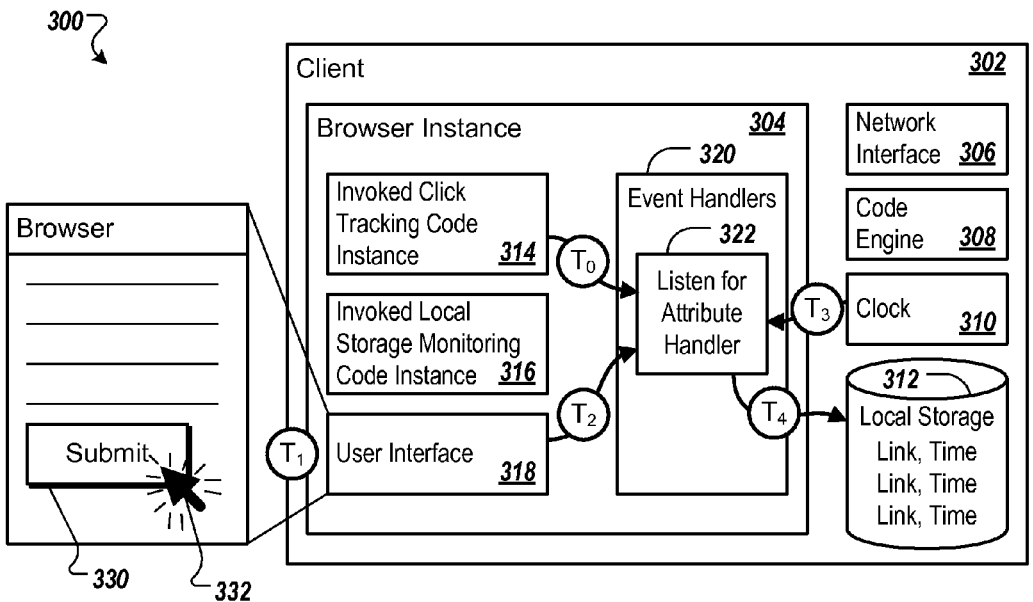
FIGS. 3A-3B are block diagrams of an example system for detecting, storing, and providing link selection information.
Figure 3B:
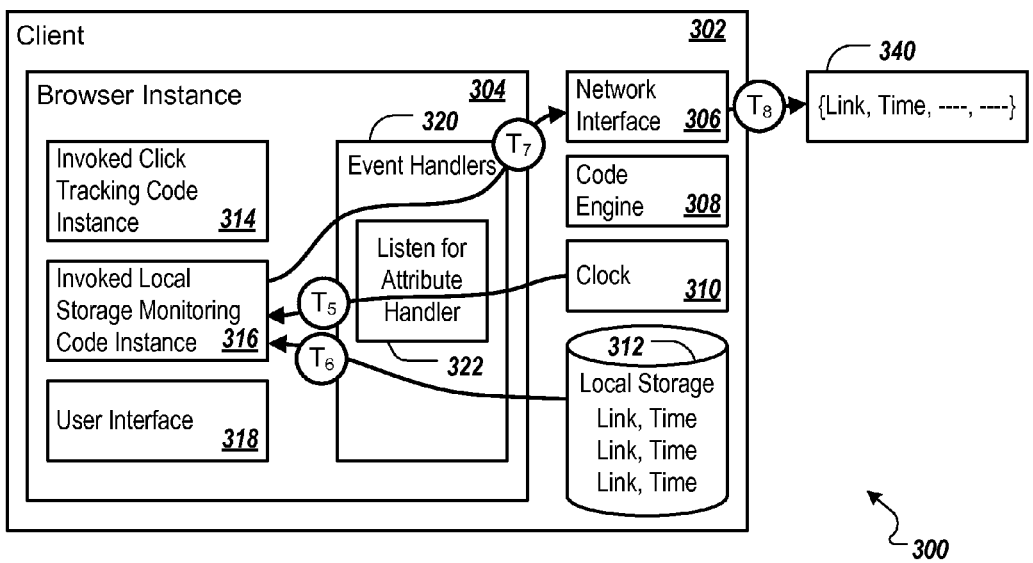

FIGS. 3A-3B are block diagrams of an example system 300 for detecting, storing, and providing link selection information. FIGS. 3A-3B also illustrates an example flow of data, shown in states ($T_0$) to ($T_8$). States ($T_0$) to ($T_8$) may occur in the illustrated sequence, or they may occur in a sequence that is different than in the illustrated sequence.

Referring to FIG. 3A, the system 300 includes a client 302. The client 302 may be a portable or stationary client computing device (e.g., the client computing device 104, shown in FIG. 1), and may include one or more processors configured to execute instructions stored by a computer-readable medium for performing various client operations, such as input/output, communication, data processing, and the like. The client 302 in the present example includes a browser instance 304, e.g., an instance of a web browser, a network interface 306, a code engine 308, a clock 310, and local storage 312.

The browser instance 304, for example, may be an instance of a web browser configured to be executed by the client 302 and/or may be a commercially available web browser. The browser instance 304 can include an invoked click tracking code instance 314, an invoked local storage monitoring code instance 316, and a user interface 318. The invoked click tracking code instance 316, for example, may be configured to detect selections (e.g., clicks) of links included in the user interface 318, to generate representations of the selections, and to store the representations in the local storage 312. The invoked local storage monitoring code instance 316, for example, may be configured to monitor the local storage 312 based on a timer interval periodically triggered by the clock 310. The user interface 318, for example, may include one or more links or controls, e.g., a submit control 330, that may be decorated with one or more attributes to facilitate click tracking.

The network interface 306 can provide communications capabilities for providing data to and receiving data from other computing devices, including computing servers (e.g., the web server 102, shown in FIG. 1) and including other clients over one or more networks (e.g., the networks 110, also shown in FIG. 1). For example, the network interface 306 may employ various communication protocols to receive data, e.g., HTML, JavaScript code, or other suitable data for rendering by the browser instance 304 for presentation to a user via the user interface 318. The network interface 306 may also provide information associated with user interactions with the user interface 318 to the web server 102, for example.

The code engine 308 can be used by the browser instance 304 to run browser code, and to run code (e.g., JavaScript) associated with particular web pages. For example, the invoked click tracking code instance 314 and the invoked local storage monitoring code instance 316 may be associated with JavaScript code that is triggered by one or more event handlers 320. When triggered, for example, such JavaScript code may be run by the code engine 308.

The clock 310 can be a system clock of the client 302. For example, the clock 310 can measure system time as it transpires. Information provided by the clock 310 may be used by timer event handlers associated with the browser instance 304 to detect the passage of time intervals, for example, and may be used to associate user activity events (e.g., clicks) with particular times (e.g., timestamps).

The local storage 312 can be used by the browser instance 304, for example, to store information associated with selections of links included in the user interface 318. In some implementations, the local storage 312 may include HTML5 local storage. For example, the local storage 312 may store key/value pairs including information associated with selected links, and timestamps of when the selections occurred. The local storage 312 may be associated with a particular web page, for example, or may be associated with multiple web pages within a web site, and may persist between web browsing sessions. For example, if the browser instance 304 were to terminate, e.g., upon closing by a user or upon crashing, the local storage 312 may persist on the client 302 and may be accessible by the web page/site when the user returns.

Referring to the example data flow, during state ($T_0$), the invoked click tracking code instance 314 is registered with the event handlers 320 in association with a listen for attribute handler 322. In the present example, the listen for attribute handler 322 can be associated with a capture-phase event listener which listens for selections of links and other controls (e.g., the submit control 330) that are decorated with a client-side click tracking attribute. During state ($T_1$), a user can employ a selection cursor 332 to interact with the user interface 318 and to select the submit control 330. For example, the user may employ a user input device (e.g., a keyboard, a mouse, a touch screen, etc.) to click the submit control 330 to submit data entered on web form to a web server.

During state ($T_2$), the listen for attribute handler 322 detects selection, e.g., the user click, of the submit control 330. In the present example, the invoked click tracking code instance 314 triggered by the handler 322 can generate a representation, e.g., a representation including a Uniform Resource Identifier, of the selection, and can store the representation with associated information, including timestamp information that specifies the time of the selection. During state ($T_3$), the handler 322 receives the current time from the clock 310, and generates a timestamp for when the submit control 330 was clicked by the user. The handler 322, for example, can serialize and concatenate the representation and timestamp information. During state ($T_4$), the representation and timestamp information are stored in local storage 312. For example, the representation and timestamp information associated with the click of the submit control 330 can be appended to information associated with preceding events.

Referring to FIG. 3B, during state ($T_5$), a timer event associated with the clock 310 triggers the invoked local storage monitoring code instance 316. For example, a predetermined time interval (e.g., a fraction of a second, a second, two seconds, five seconds, etc.) may have elapsed, triggering the local storage monitoring code instance 316 to determine whether locally stored representations of link selections may be communicated to the server. As another example, the invoked local storage monitoring code 316 may be triggered without waiting for the time interval to elapse. For example, if the submit control 330 is associated with a flag indicating that selection of the control 330 is to be communicated synchronously, the locally stored representation of the selection, and any preceding selections that may persist in the local storage 312, may be communicated upon storing the representation and timestamp information (e.g., during state ($T_4$)).

In some implementations, the determination of whether to communicate locally stored information may be made at regular intervals. For example, the local storage monitoring code instance 316 may be triggered every five seconds, or some other such interval. In some implementations, the determination of whether to communicate locally stored information may be based in part user activity. For example, upon storing the representation and timestamp information, e.g., during state ($T_4$), an event timer may be reset. Upon the timer elapsing after having been reset, i.e., if the user is inactive for a predetermined time interval, the timer may trigger the invoked local storage monitoring code instance 316.

During state ($T_6$), the invoked local storage monitoring code 316 identifies one or more representations/timestamps of link selections in the local storage 312. The invoked local storage monitoring code 316, for example, can retrieve the stored representation/timestamp information from the local storage 312, append a client ping time to the information, URI-encode the information, and generate a ping URL including the information. During state ($T_7$), the local storage monitoring code 316 communicates the retrieved representation/timestamp information. For example, the local storage monitoring code 316 may communicate the information synchronously or asynchronously, depending a synchronization flag that may be attributed to the submit control 330. During state (T8), a packet 340 of information (e.g., the ping URL) including the representation/timestamp information is communicated via the network interface 306. For example, the packet 340 may be provided to one or more web servers for recreating the user's web browsing session.

As described in the example above, a separation of code may be maintained between tracking and reporting user activity information. For example, user activity may be tracked on the client 302 using the invoked click tracking code instance 314, and may be reported to one or more servers using the invoked local storage monitoring code instance 316. Thus, in the present example, if additional or other mechanisms for reporting user activity were to be identified, implementation of such mechanisms could be readily integrated within the system 300.

Figure 4:
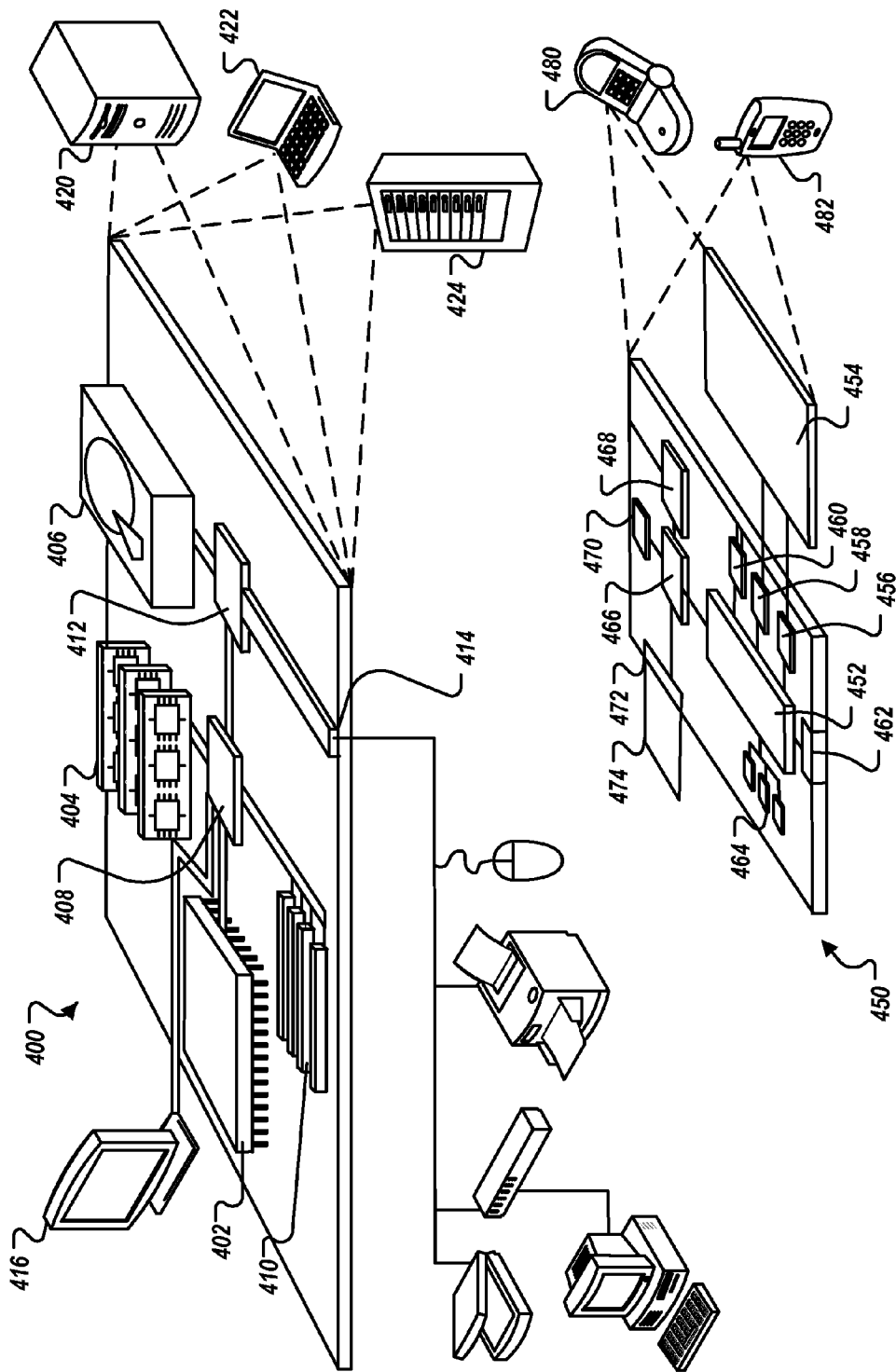
FIG. 4 shows an example of a generic computer device and a generic mobile computer device.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations, e.g., as a server bank, a group of blade servers, or a multi-processor system.

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component, e.g., a client computer having a graphical user interface or a Web browser through which a user may interact with an implementation of the systems and techniques described here, or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
obtaining a first link from data defining a first web page of a first web site;
identifying a web page to which the first link refers;
obtaining, by a processor, a classification of the first link based on the identified web page to which the first link refers;
selecting, based on the classification of the first link, a synchronization flag value that specifies when a representation of a selection of the first link is to be communicated, the synchronization flag value indicating:
if the classification comprises classifying the first link as a link to a web page of a different web site, the representation of the selection of the first link is to be synchronously communicated without waiting a predetermined period of time after the representation of the selection of the first link has been stored in local storage and
if the classification comprises classifying the first link as an intra-page link or link from the first web page to a different web page within the first web site, the representation of the selection of the first link is to be asynchronously communicated by waiting a predetermined period of time after the representation of the selection of the link has been stored in local storage; and
decorating the first link using the selected synchronization flag value.

2. The method of claim 1, wherein obtaining a classification comprises classifying the first link as:
an intra-page link based on determining the identified web page is the first web page of the first web site,
a link from the first web page to the different web page within the first web site based on determining the identified web page is the different web page within the first web site, or
a link to a web page of the different web site based on determining the identified web page is a web page of the different web site.

3. The method of claim 1, further comprising: providing a resource including the decorated first link to a client device.

4. The method of claim 1, wherein the data comprises source code of the first web page.

5. A non-transitory compute-readable medium storing software comprising instructions executable by one or more computers which, upon such execution, cause the one or more computers to perform operations comprising:
obtaining a first link from data defining a first web page of a first web site;
identifying a web page to which the first link refers;
obtaining, by a processor, a classification of the first link based on the identified web page to which the first link refers;
selecting, based on the classification of the first link, a synchronization flag value that specifies when a representation of a selection of the first link is to be communicated, the synchronization flag value indicating:
if the classification comprises classifying the first link as a link to a web page of a different web site, the representation of the selection of the first link is to be synchronously communicated without waiting a predetermined period of time after the representation of the selection of the first link has been stored in local storage and if the classification comprises classifying the first link as an intra-page link or link from the first web page to a different web page within the first web site, the representation of the selection of the first link is to be asynchronously communicated by waiting a predetermined period of time after the representation of the selection of the first link has been stored in local storage; and decorating the first link using the selected synchronization flag value.

6. The non-transitory computer-readable medium of claim 5, wherein obtaining a classification comprises classifying the first link as:
   an intra-page link based on determining the identified web page is the first web page of the first web site,
   a link from the first web page to the different web page within the first web site based on determining the identified web page is the different web page within the first web site, or
   a link to a web page of the different web site based on determining the identified web page is a web page of the different web site.

7. The non-transitory computer-readable medium of claim 5, the operations further comprising: providing a resource including the decorated first to a client device.

8. The non-transitory computer-readable medium of claim 5, wherein the data comprises source code of the first web page.

9. A system comprising:
   one or more computers and one or more storage devices storing instructions that are operable, when executed by the one or more computers, to cause the one or more computers to perform operations comprising:
   obtaining a first link from data defining a first web page of a first web site;
   identifying a web page to which the first link refers;
   obtaining, by a processor, a classification of the first link based on the identified web page to which the first link refers;

selecting, based on the classification of the first link, a synchronization flag value that specifies when a representation of a selection of the first link is to be communicated, the synchronization flag value indicating:

if the classification comprises classifying the first link as a link to a web page of a different web site, the representation of the selection of the first link is to be synchronously communicated without waiting a predetermined period of time after the representation of the selection of the first link has been stored in local storage, and if the classification comprises classifying the first link as an intra-page link or link from the first web page to a different web page within the first web site, the representation of the selection of the first link is to be asynchronously communicated by waiting a predetermined period of time after the representation of the selection of the first link has been stored in local storage; and decorating the first link using the selected synchronization flag value.

10. The system of claim 9, wherein obtaining a classification comprises classifying the first link as:
    an intra-page link based on determining the identified web page is the first web page of the first web site,
    a link from the first web page to the different web page within the first web site based on determining the identified web page is the different web page within the first web site, or
    a link to a web page of the different web site based on determining the identified web page is a web page of the different web site.

11. The system of claim 9, the operations further comprising: providing a resource including the decorated first link to a client device.

12. The system of claim 9, wherein the data comprises source code of first the web page.

* * * * *